(12) United States Patent
Kangas et al.

(10) Patent No.: US 9,703,620 B1
(45) Date of Patent: Jul. 11, 2017

(54) LOCATING LANE FAULT IN MULTIPLE-LANE BUS

(71) Applicant: Lenovo Enterprise Solutions (Singapore) PTE. LTD., New Tech Park (SG)

(72) Inventors: Paul Daniel Kangas, Raleigh, NC (US); Dustin Patterson, Durham, NC (US)

(73) Assignee: Lenovo Enterprise Solutions (Singapore) PTE., LTD., New Tech Park (SG)

( * ) Notice: Subject to any disclaimer, the term of this patent is extended or adjusted under 35 U.S.C. 154(b) by 17 days.

(21) Appl. No.: 14/990,378

(22) Filed: Jan. 7, 2016

(51) Int. Cl.
  *G06F 11/00* (2006.01)
  *G06F 11/07* (2006.01)

(52) U.S. Cl.
  CPC ........ *G06F 11/0745* (2013.01); *G06F 11/006* (2013.01); *G06F 2201/86* (2013.01)

(58) Field of Classification Search
  USPC .......................................................... 714/43
  See application file for complete search history.

(56) References Cited

U.S. PATENT DOCUMENTS

| 7,579,683 | B1* | 8/2009 | Falik ..................... G11C 5/02 257/678 |
| 2013/0159761 | A1* | 6/2013 | Baumgartner ............ H04L 1/22 714/4.5 |
| 2016/0173134 | A1* | 6/2016 | Kwon ................... H03M 13/19 714/777 |

OTHER PUBLICATIONS

"PCI Express, Base Specification", PCI Express, Revision 3.0, Nov. 10, 2010, 860 pp.

* cited by examiner

*Primary Examiner* — Sarai Butler
(74) *Attorney, Agent, or Firm* — Jason Friday

(57) ABSTRACT

A starting logical lane of a logical bus is set to the first or last physical lane of a physical bus. A width of a logical bus is set to half the number of physical lanes. If a fault is absent in the logical bus, the starting logical lane is set to the other of the first and last physical lanes. The width is repeatingly divided by two until it is equal to one lane or the fault is not present in the logical bus. When the fault is absent in the logical bus and the width is greater than one lane, the fault is present within a range of the physical lanes encompassing a contiguous number of the physical lanes and the first or last physical lane.

20 Claims, 3 Drawing Sheets

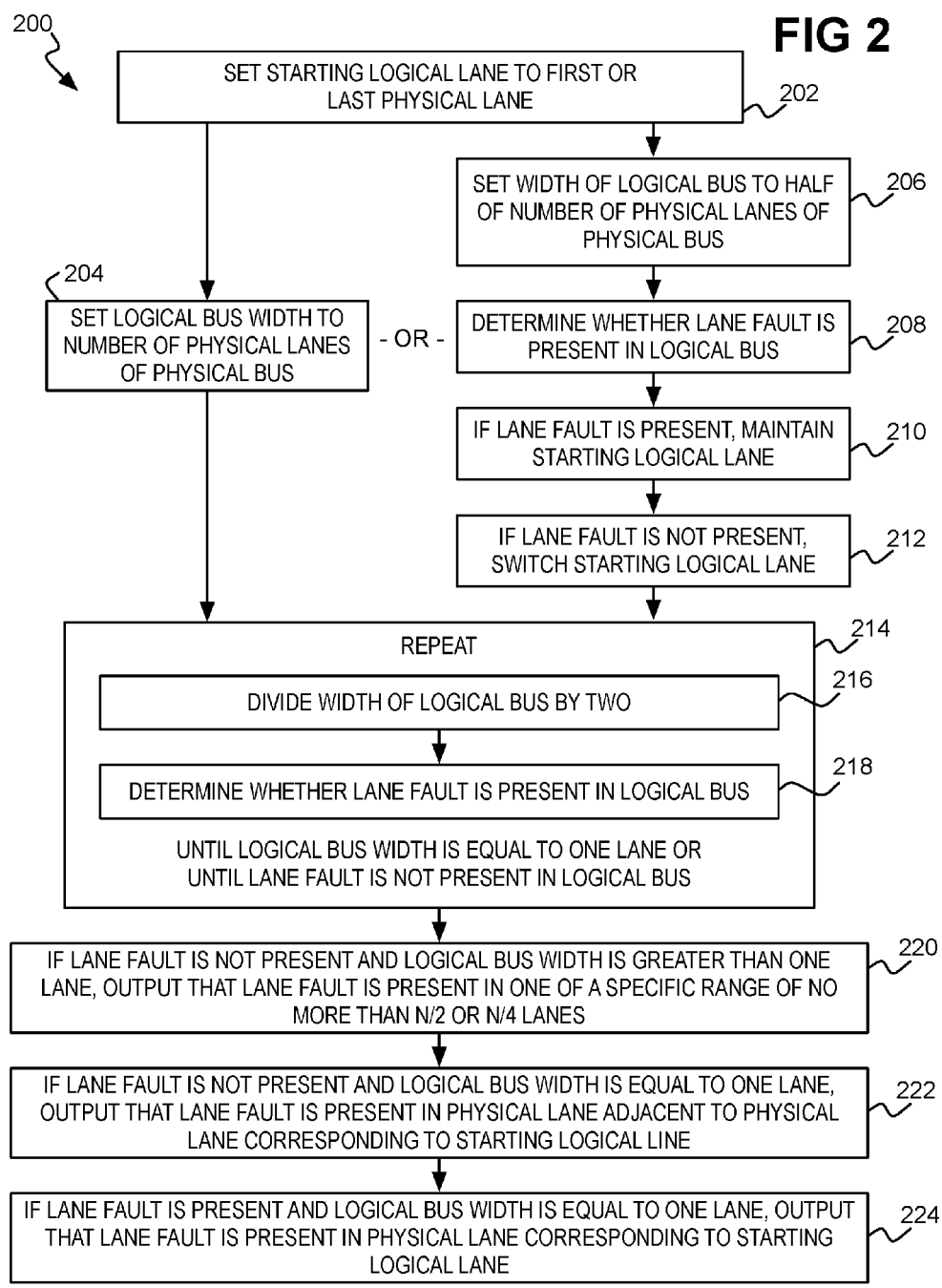

FIG 3A

| 0 | 1 | 2 | 3 | 4 | 5 | 6 | 7 | 8 | 9 | 10 | 11 | 12 | 13 | 14 | 15 |

FIG 3B

| 0 | 1 | 2 | 3 | 4 | 5 | 6 | 7 | 8 | 9 | 10 | 11 | 12 | 13 | 14 | 15 |

FIG 3C

| 0 | 1 | 2 | 3 | 4 | 5 | 6 | 7 | 8 | 9 | 10 | 11 | 12 | 13 | 14 | 15 |

LOCATING LANE FAULT IN MULTIPLE-LANE BUS

BACKGROUND

Computing devices, like desktop computers, commonly have a number of slots, or sockets, that are receptive to the insertion of peripheral device cards. In this way, the functionality of a computing device can be extended and upgraded over time. For example, some types of slots are receptive to graphics cards. As a user's need for increased graphics processing occurs, the user can replace the current graphics card with one that has better performance, without having to acquire an entirely new computer.

SUMMARY

An example method is for locating a lane fault in a physical bus of a computing device. The physical bus has a number of physical lanes including a first physical lane and a last physical lane. The method includes setting, by the computing device, a starting logical lane of a logical bus corresponding to the physical bus to one of the first and last physical lanes. The method includes setting, by the computing device, a width of the logical bus to the number of physical lanes of the physical bus. The method includes repeatingly, by the computing device, dividing the width of the logical bus by two and determining whether the lane fault is present in the logical bus, until the width of the logical bus is equal to one lane or the lane fault is not present in the logical bus. The method includes, when the lane fault is not present in the logical bus and the width of the logical bus is greater than one lane, outputting, by the computing device, that the lane fault is present in present within a range of the physical lanes encompassing a contiguous number of the physical lanes and the first or last physical lane.

An example non-transitory computer-readable data storage medium stores computer-executable code executable by a computing device to perform a method for locating a lane fault in a physical bus of a computing device. The physical bus has a number of physical lanes including a first physical lane and a last physical lane. The method includes setting a starting logical lane of a logical bus corresponding to the physical bus to one of the first and last physical lanes. The method includes setting a width of the logical bus to half of the number of physical lanes of the physical bus. The method includes determining whether the lane fault is present in the logical bus. The method includes, in response to determining that the lane fault is not present in the logical bus, setting the starting logical lane to the other of the first and last physical lanes. The method includes repeatedly dividing the width of the logical bus by two and determining whether the lane fault is present in the logical bus, until the width of the logical bus is equal to one lane or the lane fault is not present in the logical bus. The method includes, when the lane fault is not present in the logical bus and the width of the logical bus is greater than one lane, outputting that the lane fault is present in one of the physical lanes between the physical lane adjacent to the physical lane corresponding to an ending logical lane of the logical bus, and the physical lane a number of lanes, equal to the width of the logical bus, down from the physical lane corresponding to the ending logical lane.

An example computing device includes a Peripheral Component Interconnect Express (PCIe) bus having a number of physical lanes including a first physical lane and a last physical lane. The computing device includes a processor, and a non-transitory computer-readable data storing computer-executable code that the processor executes to locate a lane fault in the PCIe bus. The processor executes the code to locate the lane fault by setting a starting logical lane of a logical bus corresponding to the PCIe bus to one of the first and last physical lanes. The processor executes the code to locate the lane fault by setting a width of the logical bus to half of the number of physical lanes of the PCIe bus. The processor executes the code to locate the lane fault by determining whether the lane fault is present in the logical bus. The processor executes the code to locate the lane fault by, in response to determining that the lane fault is not present in the logical bus, setting the starting logical lane to the other of the first and last physical lanes. The processor executes the code to locate the lane fault by repeatedly dividing the width of the logical bus by two and determining whether the lane fault is present in the logical bus, until the width of the logical bus is equal to one lane or the lane fault is not present in the logical bus. The processor executes the code to locate the lane fault by, when the lane fault is not present in the logical bus and the width of the logical bus is greater than one lane, outputting that the lane fault is present in one of the physical lanes between the physical lane adjacent to the physical lane corresponding to an ending logical lane of the logical bus, and the physical lane a number of lanes, equal to the width of the logical bus, down from the physical lane corresponding to the ending logical lane.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of an example method for locating a lane fault in a multiple-physical lane bus like a PCIe bus.

FIGS. 3A, 3B, and 3C are diagrams of an example physical bus having physical lanes, of which one has a lane fault that can be located using the method of FIG. 2.

DETAILED DESCRIPTION

Figure 1:
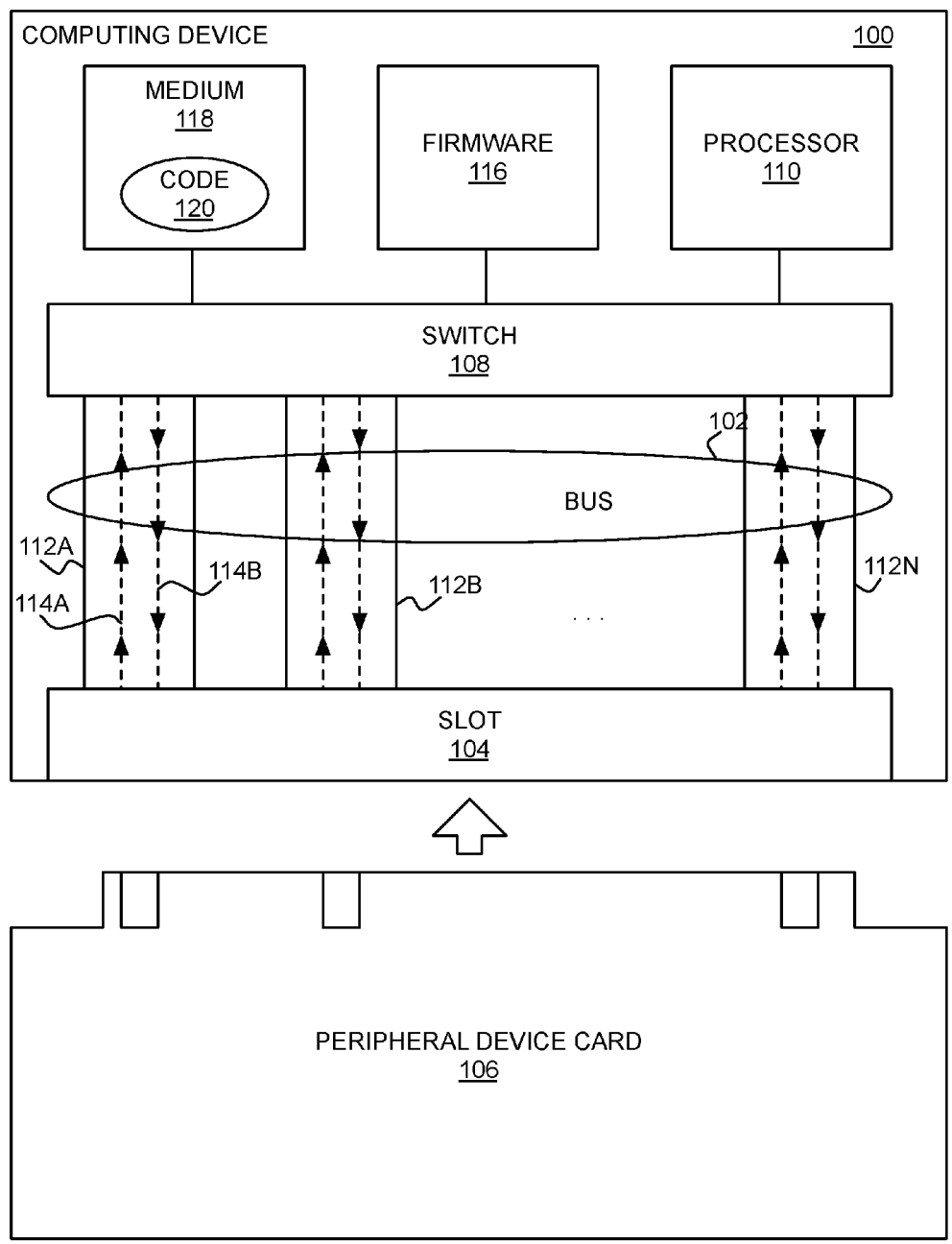
FIG. 1 is a block diagram of an example computing device including a Peripheral Component Interconnect Express (PCIe) bus.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, computing devices like desktop computers often include slots that are receptive to the insertion of peripheral device cards. A slot, or socket, is electrically connected to a physical bus of the computing device. By inserting a peripheral device card into the slot, the peripheral device card itself becomes electrically connected to this bus.

FIG. 1 shows a computing device 100, like a desktop computer, that includes a type of serial computer expansion bus 102 known as a Peripheral Component Interconnect Express (PCIe) bus. The PCIe bus 102 physically terminates at one end at a slot 104 of the computing device 100, into which a PCIe peripheral device card 106, such as a graphics card, can be inserted to electrically connect the card 106 with the device 100. The PCIe bus 102 physically terminates at another end at a PCIe switch 108, which oversees communication of data over the bus 102. Other hardware components of the computing device 100, such as a processor 110, firmware 116, and a non-transitory computer-readable medium 118 storing computer-executable code 120, are directly or indirectly connected to the PCIe switch 108. In one implementation the medium 118 and the firmware 116 can be the same component, and in another implementation they can be different components.

The PCIe bus 102 has a number of physical lanes 112A, 112B, . . . , 112N, which are collectively referred to as the physical lanes 112. In general, the number of physical lanes 112 is equal to an exponential power of two. For example, there may be two physical lanes, four physical lanes, eight physical lanes, sixteen physical lanes, thirty-two physical lanes, and so on. In the parlance of the PCIe protocol, a two-physical lane PCIe bus 102 is referred to as an ×2 bus, a four-physical lane bus 102 as an ×4 bus, an eight-physical lane bus 102 as ×8 bus, and so on.

Each physical lane 112 of the PCIe bus 102 includes two differential signaling wire pairs 114A and 114B, collectively referred to as the differential signaling wire pairs 114. The differential signaling wire pair 114B transmits data from the peripheral device card 106 to the PCIe switch 108 over the PCIe bus 102. The differential signaling wire pair 114B transmits data from the PCIe switch 108 to the peripheral device card 106 over the PCIe bus 102.

A feature of a PCIe bus 102 is that even though it has a number N of physical lanes 112, the bus 102 can communicate over a smaller M<N number of physical lanes 112, where M is equal to an exponential power of two. Therefore, a shorter peripheral device card 106 that has fewer physical lanes than the slot 104 does can still be inserted into the slot 104 and communicate data with the computing device 100 over the PCIe bus 102. The number of physical lanes 112 over which the peripheral device card 106 communicates data with the computing device 100 is collectively referred to as a link. For descriptive purposes herein, this link is said to be a logical bus having logical lanes. The logical lanes of the logical bus correspond to the physical lanes 112 over which the peripheral device card 106 can actually communicate data with the computing device 100.

For example, an ×16 PCIe bus 102 can be receptive to insertion of an ×1, ×2, ×4, ×8, or ×16 PCIe peripheral device card 106 to correspondingly communicative over an ×1, ×2, ×4, ×8, or ×16 PCIe link or logical bus. The speed or throughput at which data is communicated over the PCIe bus 102, however, is dictated by the number of physical lanes within the link, and thus by the number of logical lanes of the logical bus. For example, an ×8 PCIe link is generally twice as slow as an ×16 PCIe link.

Another feature of a PCIe bus 102 is that a PCIe peripheral device card 106 having more physical lanes than the PCIe bus 102 can still communicate data with the computing device 100 over the PCIe bus 102. For example, the peripheral device card 106 may have thirty-two physical lanes, whereas the PCIe bus 102 may have just sixteen physical lanes. The slot 104 may be receptive to a thirty-two-physical lane peripheral device card 106 even though the PCIe bus 102 has just sixteen physical lanes.

By comparison, if the slot 104 has just sixteen physical lanes, a riser card or other converter may be used. In this latter case, the riser card or converter may have a thirty-two-physical lane socket or slot into which the peripheral device card 106 is inserted, and a sixteen-physical lane card edge that is inserted into the slot 104 of the computing device 100. In this example, an ×32 PCIe peripheral device card 106 can thus communicate data over an ×16 PCIe bus 102 via an ×16 PCIe link or logical bus, but at half the speed or throughput than if it were connected to an ×32 PCIe bus 102.

In general, a PCIe link is established over a PCIe bus 102 beginning either at the first physical lane 112A of the bus 102 or at the last physical lane 112N of the bus 102. This is referred to as lane reversal. That is, although conventionally a PCIe link is established at the first physical lane 112A of the PCIe bus 102, the PCIe protocol specifies that the link can instead be established at the last physical lane 112N. In the former case, the first lane of the link is the first physical lane, the second lane of the link is the second physical lane, the third lane of the link is the third physical lane, and so on. In the latter case, the first lane of the link is the last physical lane, the second lane of the link is the second to last physical lane, the third lane of the link is the third to last physical lane, and so on.

For example, an ×8 link established over the PCI bus 102 beginning at the first physical lane 112A includes the first eight physical lanes 112 of the PCI bus 102 starting at this physical lane 112A. The corresponding logical bus is said to have eight logical lanes that correspond to the first eight physical lanes 112, proceeding from left to right in FIG. 1. As another example, an ×4 link established over the PCI bus 102 beginning at the last physical lane 112N includes the last four physical lanes 112 of the PCI bus 102 starting at this physical lane 112N and proceeding from right to left in FIG. 1. The corresponding logical bus is said to have four logical lanes that correspond to the last four physical lanes.

Like other types of hardware, a PCIe bus 102 can and does fail. The failure of the bus 102 may be at the switch 108, at the slot 104, or at the edge of the peripheral device card 106 where the card 106 is inserted into the slot 104. In many situations, just one lane 112 has a fault. However, the PCIe protocol, as well as potentially the protocols for other types of serial computer expansion buses and the protocols for other types of buses in general, does not provide a way by which to locate and identify which lane 112 in particular has suffered a lane fault. For example, another type of serial bus to which the techniques disclosed herein are amenable is the QuickPath Interconnect (QPI) bus, which is a point-to-point processor interconnect that can be used to replace the front-side bus (FSB) in computing device platforms.

The techniques disclosed herein provide for locating a lane fault in a physical bus of a computing device, such as a serial computer expansion bus like a PCIe bus. In the context of a PCIe bus, at best the techniques disclosed herein can identify the exact lane at which there is a fault. In one implementation, at worst the techniques disclosed herein can, for an ×N PCIe bus, identify a range of N/2 lanes that include the lane at which there is a fault. In another implementation, at worst the techniques disclosed herein can identify a range of N/4 lanes that include the lane at which there is a fault.

FIG. 2 shows an example method 200 for locating a lane fault in a multiple-lane physical bus of a computing device, such as a PCIe bus. The method can be performed by the computing device itself, such as by the firmware of the device. For example, in the computing device 100 of FIG. 1, the processor 110 may execute the computer-executable code 120 stored in the computer-readable medium 118 to perform the method 200. In general, the method 200 sets a logical bus with a successively smaller bus width encompassing successively fewer physical lanes of the physical bus, and determines whether the lane fault is within one of the physical lanes encompassed by the logical bus. This process continues until the logical bus has a bus width of just one logical lane, meaning that the fault is in that lane or in the adjacent lane, or until the lane fault is not encompassed by the logical bus. In the latter case, if the bus width is greater than one lane, then the lane fault is located within one of the physical lanes that were most immediately encompassed by the logical bus prior to its most recent decrease in size.

A starting logical lane of a logical bus corresponding to the physical bus is set to the first physical lane or the last physical lane of the physical bus (202). In one implementation, for a PCIe bus, the starting logical lane can be set to the first or last physical lane by configuring a root port of the PCIe bus to the physical lane in question within firmware of the computing device. Next, either part 204 or parts 206, 208, 210, and 212 are performed.

Part 204 is performed if the physical bus does not support lane reversal or if lane reversal is not desired to be performed if needed, whereas part 206 is performed if the physical bus does support lane reversal and lane reversal is desired to be performed if needed. In general, performing parts 206, 208, 210, and 212 means that for a physical bus having N physical lanes, the worst case scenario in locating the lane fault is identifying a range of N/4 physical lanes within which the fault is located. By comparison, performing part 204 means that the worst case scenario is identifying a range of N/2 physical lanes within which the fault is located. As noted above, lane reversal means that the starting logical lane of the logical bus can be switched from the first physical lane to the last physical lane, and vice-versa.

If lane reversal is not supported or is not desired to be performed, the logical bus width is set to the number of physical lanes of the physical bus (204). For example, if the physical bus has sixteen physical lanes, then the logical bus is set to sixteen logical lanes that correspond to the sixteen physical lanes, beginning with the starting logical lane. In one implementation, setting the logical bus width in the case of a PCIe physical bus is performed during configuration of the PCIe root port, which establishes both the starting logical lane and the number of lanes of the logical bus, in the context of a PCIe link. The method 200 then proceeds to part 214.

By comparison, if lane reversal is supported and is desired to be performed if needed, the logical bus width is set to half the number of physical lanes of the physical bus (206). For example, if the physical bus has sixteen physical lanes from a first physical lane 0 to a last physical lane 15, and if the starting logical lane corresponds to the first physical lane 0, then the logical bus has a bus width of eight lanes, with eight logical lanes corresponding to physical lanes 0-7. By comparison, if the physical bus has sixteen physical lanes and the starting logical lane corresponds to the last physical lane 15, then the logical bus has a bus width of eight lanes, with eight logical lanes corresponding to physical lanes 15-8. Setting the logical bus width can be performed in one implementation as described above, during configuration of the PCIe root port.

The computing device determines whether the lane fault is present in the logical bus (208). Because the logical bus width is half the width of the physical bus, there are two possibilities: either the lane fault is present within one of the physical lanes to which the logical lanes of the logical bus correspond, or the lane fault is present within one of the physical lanes other than those to which the logical lanes correspond. If the lane fault is present within one of the physical lanes to which the logical lanes corresponds, then the starting logical lane is maintained to the physical lane to which it was set in part 202 (210).

By comparison, if the lane fault is not present within one of the physical lanes to which the logical lanes correspond, then the starting logical lane is switched (212). That is, if the starting logical lane was set to the first physical lane in part 202, then it is switched to the last physical lane, and vice-versa. This is to ensure that the logical bus encompasses the lane fault. Determining whether a lane fault is present can include rebooting the computing device, and performing a power-on self test (POST) thereof. The POST will identify whether there is a lane fault within the logical bus—i.e., within the context of a PCIe bus, whether there is a lane fault within a PCIe link of a number of lanes equal to the logical bus width.

From either part 204 or part 212, the method 200 repeats the following until the logical bus width is equal to one lane or until the lane fault is not present in the logical bus (214). First, the logical bus width is divided by two (216). For example, if the physical bus has N physical lanes and part 204 was performed to set the logical bus width to N, then the logical bus width is now set to N/2. By comparison, if the physical bus has N physical lanes and parts 206, 208, 210, and 212 were performed to set the logical bus width to N/2, then the logical bus width is now set to N/4. The starting logical lane does not change, and remains as either the first or last physical lane as was set in part 202 and as may have been switched in part 212.

Therefore, if the N physical lanes of the physical bus are 0 through N−1, and if the starting logical lane is the physical lane 0, if part 204 was performed this means that the first time part 216 is performed the logical lanes correspond to the physical lanes 0 through (N/2)−1. By comparison, if parts 206, 208, 210, and 212 were performed and the starting logical lane was not switched, this means that the first time part 216 is performed the logical lanes correspond to the physical lanes 0 through (N/4)−1. If the starting logical lane was switched, the first time part 216 is performed the logical lanes correspond to the physical lanes N−1 through N/4.

The method 200 then determines whether a lane fault is present in the newly reduced-in-width logical bus (218), which can be performed as has been described above, via a computing device reboot and POST. Parts 216 and 218 are repeated to iteratively divide the logical bus width by two and determining whether the logical bus still encompasses the lane fault until the logical bus width is one or until the lane fault is not present in the logical bus. Once the lane fault is not present in the logical bus, this means that no further reductions in size of the logical bus width would better narrow the range of physical lanes that encompass the lane fault. Once the logical bus width is equal to one lane, the logical bus width cannot be reduced further, which means that the lane fault is present in the starting logical lane, which is the only lane of the logical bus, or is present in the lane adjacent to this starting logical lane.

Therefore, once the iterative process of part 214 ends, there are three possibilities. If the lane fault is not present within any of the physical lanes to which the logical lanes of the logical bus correspond, and the logical bus width is greater than one lane, then the method 200 outputs that the lane fault is present within one of the physical lanes within a specific range of no more than N/2 or N/4 lanes (220). The range is no greater than N/2 physical lanes if part 204 is performed, and is no greater than N/4 lanes if parts 206, 208, 210, and 212 were performed.

The range of physical lanes starts at the physical lane adjacent to the physical lane that corresponds to the ending logical lane of the logical bus. The range ends at the physical lane a number of lanes equal to the logical bus width down from the physical lane corresponding to the ending logical lane. As an example, the logical bus may have a bus width of four lanes, with a starting logical lane corresponding to physical lane 0 and an ending logical lane corresponding to physical lane 3. Therefore, the range of physical lanes between (i.e., within) which the lane fault is present is physical lane 4 through physical lane 7. Physical lane 4 is the physical lane adjacent to physical lane 3 that corresponds to the ending logical lane. Physical lane 7 is the physical lane that is four lanes down (i.e., the width of the logical bus) from physical lane 3.

If the lane fault is not present and the logical bus width is equal to one lane, then the method 200 outputs that the lane fault is present in the physical lane adjacent to the physical lane corresponding to the starting logical lane (222). Part 222 is thus a special case of part 220. Because the logical bus width is one lane, the range of physical lanes within which the lane fault is present effectively collapses to one lane, which is the lane adjacent to the starting logical lane. For example, if the starting logical lane corresponds to physical lane 0, then the lane fault is present in physical lane 1, whereas if the starting logical lane corresponds to physical lane N−1, then the lane fault is present in physical lane N−2.

The last possibility is that if the lane fault is present and the logical bus width is equal to one lane, then the method 200 outputs that the lane fault is present in the physical lane corresponding to the starting logical lane (224). The method 200 thus aids in locating a lane fault in a multiple-lane bus, by reducing the number of physical lanes that have to be inspected for the lane fault. In the best case scenario, the method 200 results in part 222 or part 224 being performed, with the identification of the actual physical lane at which there is a lane fault. In the worst case scenario, the method 200 results in part 220 being performed after parts 216 and 218 having been performed just one. If part 204 was also performed, then the number of physical lanes that have to be inspected for the lane fault is reduced in this worst case scenario to N/2 lanes. If parts 206, 208, 210, and 212 were also performed, then the number of physical lanes that have to be inspected for the lane fault is reduced in this worst case scenario to N/4 lanes.

FIGS. 3A, 3B, and 3C show an example physical bus having sixteen physical lanes 0 through 15. In FIG. 3A, physical lane 10 has a lane fault. In FIG. 3B, physical lane 1 has a lane fault. In FIG. 3C, physical lane 3 has a lane fault. Example performance of the method 200 to locate these lane faults is now described. It is assumed that in part 202, the starting logical lane is set to the first physical lane 0.

With respect to FIG. 3A, it is first assumed that part 204 and not parts 206, 208, 210, and 212 is performed. Therefore, the logical bus width is set to sixteen lanes in part 204. In part 216, the logical bus width is divided by two, resulting in the logical bus having logical lanes corresponding to physical lanes 0 through 7. In part 218, it is determined that the lane fault is not present in any of these lanes, such that part 214 ends with just one iteration having been performed. The method 200 outputs a range of 16/2=8 physical lanes, specifically physical lanes 8-15, within which the lane fault is located.

If parts 206, 208, 210, and 212 are performed instead of part 204, the logical bus width is set to eight lanes in part 206, resulting in the logical bus having logical lanes corresponding to physical lanes 0 through 7. In part 208, it is determined that the lane fault is not present in any of these lanes, such that in part 212, the starting logical lane is switched to physical lane 15. The logical bus width remains at eight lanes, which means that the logical bus has logical lanes corresponding to physical lanes 15-8.

In part 216, the logical bus width is divided by two, resulting in the logical bus having logical lanes corresponding to physical lanes 15-12. In part 218, it is determined that the lane fault is not present in any of these lanes, such that part 214 ends with just one iteration having been performed. The method 200 outputs in part 220 a range of 16/4=4 physical lanes, specifically physical lanes 11-8, within which the lane fault is located.

With respect to FIG. 3B, it is assumed that parts 206, 208, 210, and 212 are performed. The logical bus width is set to eight lanes in part 216, resulting in the logical bus having logical lanes corresponding to physical lanes 0 through 7. In part 208, it is determined that the lane fault is present in one of these lanes, such that in part 210, the starting logical lane is maintained as physical lane 0. In part 216, the logical bus width is divided by two, resulting in the logical bus having logical lanes corresponding to physical lanes 0-3. In part 218, it is determined that the lane fault is present in one of these lanes. As such, a second iteration of part 214 is performed.

In the second iteration of part 214, in part 216, the logical bus width is again divided by two, resulting in the logical bus having logical lanes corresponding to physical lanes 0-1. In part 218, it is determined that the lane fault is present in one of these lanes, such that a third iteration of part 214 is performed. In the third iteration of part 214, in part 216, the logical bus width is again divided by two, resulting in the logical bus having one logical lane corresponding to physical lane 0. In part 218, it is determined that the lane fault is not present in one of these lanes. Part 214 thus ends with this third iteration. The method 200 outputs in part 222 that the lane fault is present within physical lane 1, which is the lane adjacent to physical lane 0.

With respect to FIG. 3C, it is assumed that part 204 and not parts 206, 208, 210, and 212 is performed. The logical bus width is set to sixteen lanes in part 204, resulting in the logical bus having logical lanes corresponding to all physical lanes 0 through 15. In part 216, the logical bus width is divided by two, resulting in the logical bus having logical lanes corresponding to physical lanes 0-7. In part 218, it is determined that the lane fault is present in one of these lanes. As such, a second iteration of part 214 is performed.

In the second iteration of part 214, in part 216, the logical bus width is again divided by two, resulting in the logical bus having logical lanes corresponding to physical lanes 0-3. In part 218, it is determined that the lane fault is present in one of these lanes, such that a third iteration of part 214 is performed. In the third iteration of part 214, in part 216, the logical bus width is again divided by two, resulting in the logical bus having logical lanes corresponding to physical lanes 0-1. In part 218, it is determined that the lane fault is not present in one of these lanes. Part 214 thus ends with this third iteration. The method 200 outputs in part 220 that the lane fault is present within a range of 16/8=2 lanes, specifically lanes 2-3.

These examples thus illustrate how the techniques disclosed herein can either specifically identify the particular physical lane that is suffering from a lane fault, or at least identify a small range of physical lanes that include the faulty lane. In the example of FIG. 3B, for instance, a user does not have to manually test any of the physical lanes, because physical lane 1 that has a lane fault will have been specifically identified. In the example of FIG. 3A, a user just has to manually test four or eight physical lanes (depending on whether part 204 or parts 206, 208, 210, and 212 are performed), instead of all sixteen physical lanes, to identify the lane having a lane fault. In the example of FIG. 3C, a user just has to manually test two physical lanes, instead of all sixteen physical lanes, to identify the lane having a lane fault. As such, the techniques disclosed herein permit users to more quickly identify a physical lane of a physical bus that has a lane fault.

The techniques disclosed herein are further unintuitive and nonobvious, at least insofar as they contradict established PCIe bus fault tolerance procedures. Because a PCIe bus can establish a link with a PCIe peripheral card over fewer than the maximum number of lanes, in general when a fault occurs in a physical lane, the PCIe bus and the PCIe peripheral card will establish a PCIe link encompassing the greatest number of physical lanes possible that do not include the faulty lane. By comparison, the techniques disclosed herein in effective follow the faulty lane inasmuch as possible, forcing a reconfiguration of the PCIe link (i.e., the logical bus), to encompass the faulty lane.

It is finally noted that, although specific embodiments have been illustrated and described herein, it will be appreciated by those of ordinary skill in the art that any arrangement calculated to achieve the same purpose may be substituted for the specific embodiments shown. For instance, whereas the techniques disclosed herein have been described largely in relation to a PCIe bus, the techniques may be applicable to other types of serial computer expansion buses as well as other types of buses. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method for locating a lane fault in a physical bus of a computing device, the physical bus having a number of physical lanes including a first physical lane and a last physical lane, the method comprising:
   setting, by the computing device, a starting logical lane of a logical bus corresponding to the physical bus to one of the first and last physical lanes;
   setting, by the computing device, a width of the logical bus to the number of physical lanes of the physical bus;
   repeatedly, by the computing device, dividing the width of the logical bus by two and determining whether the lane fault is present in the logical bus, until the width of the logical bus is equal to one lane or the lane fault is not present in the logical bus; and
   when the lane fault is not present in the logical bus and the width of the logical bus is greater than one lane, outputting, by the computing device, that the lane fault is present within a range of the physical lanes encompassing a contiguous number of the physical lanes and the first or last physical lane.

2. The method of claim 1, wherein the range of the physical lanes includes the physical lanes between the physical lane adjacent to the physical lane corresponding to an ending logical lane of the logical bus, and the physical lane a number of lanes, equal to the width of the logical bus, down from the physical lane corresponding to the ending logical lane.

3. The method of claim 1, wherein setting the width of the logical bus to the number of physical lanes comprises setting the width of the bus to half the number of physical lanes instead, the method further comprising, before repeatedly dividing the width of the logical bus by two and determining whether the lane fault is present in the logical bus, until the width of the logical bus is equal to one lane or the lane fault is not present in the logical bus:
   determining, by the computing device, whether the lane fault is present in the logical bus;
   in response to determining that the lane fault is not present in the logical bus, setting, by the computing device, the starting logical lane to the other of the first and last physical lanes; and
   in response to determining that the lane fault is present in the logical bus, maintaining the starting logical lane to the one of the first physical lane and the last physical lane.

4. The method of claim 1, further comprising, after repeatingly dividing the width of the logical bus by two and determining whether the lane fault is present in the logical bus until the width of the logical bus is equal to one lane or the lane fault is not present in the logical bus:
   when the lane fault is present in the logical bus and the width of the logical bus is equal to one lane, outputting, by the computing device, that the lane fault is present in the physical lane to which the starting logical lane corresponds.

5. The method of claim 4, further comprising, after repeatingly dividing the width of the logical bus by two and determining whether the lane fault is present in the logical bus until the width of the logical bus is equal to one lane or the lane fault is not present in the logical bus:
   when the lane fault is not present in the logical bus and the width of the logical bus is equal to one lane, outputting, by the computing device, that the lane fault is present in the physical lane adjacent to the physical lane to which the starting logical lane corresponds.

6. The method of claim 1, wherein the physical bus is a Peripheral Component Interconnect Express (PCIe) bus.

7. The method of claim 6, wherein the number of physical lanes is equal to one of 16 and 32.

8. The method of claim 6, wherein:
   setting the starting logical lane to the one of the first and last physical lanes comprises configuring a root port of the PCIe bus to the one of the first and last physical lanes within firmware of the computing device; and
   setting the starting logical lane to the other of the first and last physical lanes comprises reconfiguring the root port to the other of the first and last physical lanes within the firmware.

9. The method of claim 6, wherein determining whether the lane fault is present in the logical bus comprises:
   rebooting the computing device; and
   performing a power-on self test (POST) of the computing device.

10. A non-transitory computer-readable data storage medium storing computer-executable code executable by a computing device to perform a method for locating a lane fault in a physical bus of a computing device, the physical bus having a number of physical lanes including a first physical lane and a last physical lane, the method comprising:
  setting a starting logical lane of a logical bus corresponding to the physical bus to one of the first and last physical lanes;
  setting a width of the logical bus to half of the number of physical lanes of the physical bus;
  determining whether the lane fault is present in the logical bus;
  in response to determining that the lane fault is not present in the logical bus, setting the starting logical lane to the other of the first and last physical lanes;
  repeatingly dividing the width of the logical bus by two and determining whether the lane fault is present in the logical bus, until the width of the logical bus is equal to one lane or the lane fault is not present in the logical bus; and
  when the lane fault is not present in the logical bus and the width of the logical bus is greater than one lane, outputting that the lane fault is present in one of the physical lanes between the physical lane adjacent to the physical lane corresponding to an ending logical lane of the logical bus, and the physical lane a number of lanes, equal to the width of the logical bus, down from the physical lane corresponding to the ending logical lane.

11. The non-transitory computer-readable data storage medium of claim 10, wherein the method further comprises, after setting the width of the logical bus to half of the number of physical lanes and after determining whether the lane fault is present in the logical bus:
  in response to determining that the lane fault is present in the logical bus, maintaining the starting logical lane to the one of the first physical lane and the last physical lane.

12. The non-transitory computer-readable data storage medium of claim 10, wherein the method further comprises, after repeatedly dividing the width of the logical bus by two and determining whether the lane fault is present in the logical bus until the width of the logical bus is equal to one lane or the lane fault is not present in the logical bus:
  when the lane fault is present in the logical bus and the width of the logical bus is equal to one lane, outputting that the lane fault is present in the physical lane to which the starting logical lane corresponds.

13. The non-transitory computer-readable data storage medium of claim 12, wherein the method further comprises, after repeatedly dividing the width of the logical bus by two and determining whether the lane fault is present in the logical bus until the width of the logical bus is equal to one lane or the lane fault is not present in the logical bus:
  when the lane fault is not present in the logical bus and the width of the logical bus is equal to one lane, outputting that the lane fault is present in the physical lane adjacent to the physical lane to which the starting logical lane corresponds.

14. The non-transitory computer-readable data storage medium of claim 10, wherein the physical bus is a Peripheral Component Interconnect Express (PCIe) bus.

15. The non-transitory computer-readable data storage medium of claim 10, wherein:
  setting the starting logical lane to the one of the first and last physical lanes comprises configuring a root port of the PCIe bus to the one of the first and last physical lanes within firmware of the computing device;
  setting the starting logical lane to the other of the first and last physical lanes comprises reconfiguring the root port to the other of the first and last physical lanes within the firmware; and
  determining whether the lane fault is present in the logical bus comprises:
    rebooting the computing device; and
    performing a power-on self test (POST) of the computing device.

16. A computing device comprising:
  a Peripheral Component Interconnect Express (PCIe) bus having a number of physical lanes including a first physical lane and a last physical lane;
  a processor;
  a non-transitory computer-readable data storing computer-executable code that the processor executes to locate a lane fault in the PCIe bus by:
    setting a starting logical lane of a logical bus corresponding to the PCIe bus to one of the first and last physical lanes;
    setting a width of the logical bus to half of the number of physical lanes of the PCIe bus;
    determining whether the lane fault is present in the logical bus;
    in response to determining that the lane fault is not present in the logical bus, setting the starting logical lane to the other of the first and last physical lanes;
    repeatingly dividing the width of the logical bus by two and determining whether the lane fault is present in the logical bus, until the width of the logical bus is equal to one lane or the lane fault is not present in the logical bus; and
    when the lane fault is not present in the logical bus and the width of the logical bus is greater than one lane, outputting that the lane fault is present in one of the physical lanes between the physical lane adjacent to the physical lane corresponding to an ending logical lane of the logical bus, and the physical lane a number of lanes, equal to the width of the logical bus, down from the physical lane corresponding to the ending logical lane.

17. The computing device of claim 16, wherein the processor executes the computer-executable code to locate the lane fault by further, after setting the width of the logical bus to half of the number of physical lanes and after determining whether the lane fault is present in the logical bus:
  in response to determining that the lane fault is present in the logical bus, maintaining the starting logical lane to the one of the first physical lane and the last physical lane.

18. The computing device of claim 16, wherein the processor executes the computer-executable code to locate the lane fault by further, after repeatedly dividing the width of the logical bus by two and determining whether the lane fault in the physical bus is present in the logical bus until the width of the logical bus is equal to one lane or the lane fault is not present in the logical bus:
  when the lane fault is present in the logical bus and the width of the logical bus is equal to one lane, outputting that the lane fault is present in the physical lane to which the starting logical lane corresponds.

19. The computing device of claim 18, wherein the processor executes the computer-executable code to locate the lane fault by further, after repeatedly dividing the width of the logical bus by two and determining whether the lane fault in the physical bus is present in the logical bus until the width of the logical bus is equal to one lane or the lane fault is not present in the logical bus:
  when the lane fault is not present in the logical bus and the width of the logical bus is equal to one lane, outputting that the lane fault is present in the physical lane adjacent to the physical lane to which the starting logical lane corresponds.

20. The computing device of claim 16, further comprising firmware, wherein:
  setting the starting logical lane to the one of the first and last physical lanes comprises configuring a root port of the PCIe bus to the one of the first and last physical lanes within the firmware;
  setting the starting logical lane to the other of the first and last physical lanes comprises reconfiguring the root port to the other of the first and last physical lanes within the firmware; and
  determining whether the lane fault is present in the logical bus comprises:
    rebooting the computing device; and
    performing a power-on self test (POST) of the computing device.

\* \* \* \* \*